United States Patent
McCabe et al.

(10) Patent No.: US 9,524,015 B2
(45) Date of Patent: Dec. 20, 2016

(54) DEVICE OPTIMIZED POWER MANAGEMENT

(71) Applicant: Western Digital Technologies, Inc., Irvine, CA (US)

(72) Inventors: Timothy J. McCabe, Mission Viejo, CA (US); Edwin D. Barnes, Lake Forest, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 301 days.

(21) Appl. No.: 14/256,693

(22) Filed: Apr. 18, 2014

(65) Prior Publication Data

US 2015/0234447 A1    Aug. 20, 2015

Related U.S. Application Data

(60) Provisional application No. 61/941,853, filed on Feb. 19, 2014.

(51) Int. Cl.
  *G06F 1/32* (2006.01)
  *G06F 3/06* (2006.01)

(52) U.S. Cl.
  CPC ........... *G06F 1/3268* (2013.01); *G06F 3/0625* (2013.01); *Y02B 60/1246* (2013.01)

(58) Field of Classification Search
  CPC .................... G06F 1/3268; G06F 3/0625
  See application file for complete search history.

(56) References Cited

U.S. PATENT DOCUMENTS

| | | | |
|---|---|---|---|
| 5,682,273 A | 10/1997 | Hetzler | |
| 5,905,901 A | 5/1999 | Klein | |
| 5,913,067 A | 6/1999 | Klein | |
| 5,954,820 A | 9/1999 | Hetzler | |
| 6,499,054 B1 | 12/2002 | Hesselink et al. | |
| 6,592,313 B2 | 7/2003 | Kohori | |
| 6,732,158 B1 | 5/2004 | Hesselink et al. | |
| 6,845,456 B1 | 1/2005 | Menezes et al. | |
| 6,987,635 B2 * | 1/2006 | Akagi | G11B 19/28 360/69 |

(Continued)

FOREIGN PATENT DOCUMENTS

| | | |
|---|---|---|
| EP | 0996233 | 4/2000 |
| WO | 2005022321 | 3/2005 |

OTHER PUBLICATIONS

Dean V. Dang, et al., U.S. Appl. No. 14/038,733, filed Sep. 26, 2013, 27 pages.

(Continued)

*Primary Examiner* — Stefan Stoynov
(74) *Attorney, Agent, or Firm* — Young Law Firm, P.C.

(57) ABSTRACT

A data storage system including memory configured to store content, a host configured to determine time to next data information based on the content stored in the memory, and a data storage device including a controller. The controller can be configured to receive the time to next data information from the host, select a power mode for the data storage device from a plurality of power modes for the data storage device based on the time to next data information, and place the data storage device in the selected power mode. The host can be configured to transmit the time to next data information to the data storage device.

25 Claims, 4 Drawing Sheets

(56) References Cited

U.S. PATENT DOCUMENTS

| | | | |
|---|---|---|---|
| 7,075,744 B2 * | 7/2006 | Cumpson | G06F 1/3203 360/69 |
| 7,120,692 B2 | 10/2006 | Hesselink et al. | |
| 7,206,948 B2 | 4/2007 | Brauer | |
| 7,231,198 B2 | 6/2007 | Loughran | |
| 7,254,721 B1 | 8/2007 | Tobias et al. | |
| 7,275,166 B2 | 9/2007 | Kaiju et al. | |
| 7,411,757 B2 | 8/2008 | Chu et al. | |
| 7,425,810 B2 | 9/2008 | Hobbet et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,552,347 B2 | 6/2009 | Schutte | |
| 7,564,639 B2 * | 7/2009 | Korst | G06F 1/3203 360/69 |
| 7,568,068 B2 | 7/2009 | Kulkarni et al. | |
| 7,587,467 B2 | 9/2009 | Hesselink et al. | |
| 7,600,036 B2 | 10/2009 | Hesselink et al. | |
| 7,647,513 B2 | 1/2010 | Tobias et al. | |
| 7,672,263 B2 | 3/2010 | Sinivaara | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 8,004,791 B2 | 8/2011 | Szeremeta et al. | |
| 8,131,892 B2 | 3/2012 | Kumasawa et al. | |
| 8,255,661 B2 | 8/2012 | Karr et al. | |
| 8,285,965 B2 | 10/2012 | Karr et al. | |
| 8,286,018 B2 | 10/2012 | Chang et al. | |
| 8,296,513 B1 | 10/2012 | Liu | |
| 8,325,555 B2 | 12/2012 | Jeong et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 9,141,176 B1 | 9/2015 | Chen | |
| 2004/0266386 A1 | 12/2004 | Kuo | |
| 2005/0144195 A1 | 6/2005 | Hesselink et al. | |
| 2005/0144200 A1 | 6/2005 | Hesselink et al. | |
| 2008/0168219 A1 * | 7/2008 | Molaro | G06F 11/1435 711/112 |
| 2009/0210654 A1 | 8/2009 | Koul | |
| 2010/0262847 A1 | 10/2010 | Kim et al. | |
| 2011/0047316 A1 | 2/2011 | Farhan et al. | |
| 2011/0283128 A1 | 11/2011 | Farhan et al. | |
| 2012/0023350 A1 | 1/2012 | Russo et al. | |
| 2012/0036041 A1 | 2/2012 | Hesselink | |
| 2012/0191996 A1 | 7/2012 | Cheong | |
| 2013/0107774 A1 | 5/2013 | Wang et al. | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |

OTHER PUBLICATIONS

International Search Report and Written Opinion dated Apr. 29, 2015 from related PCT Serial No. PCT/US2015/016168, 10 pages.

* cited by examiner

DEVICE OPTIMIZED POWER MANAGEMENT

CROSS-REFERENCE TO RELATED APPLICATIONS

This application claims the benefit of U.S. Provisional Application No. 61/941,853, filed on Feb. 19, 2014, entitled "DEVICE OPTIMIZED POWER MANAGEMENT," which is hereby incorporated by reference in its entirety.

BACKGROUND

Conventionally, a hard disk drive may consume a lot of power. In order to reduce power consumption, the hard disk drive may enter various power modes. However, the hard disk drive may not enter the most efficient power mode.

In such a case, the hard disk drive may be losing opportunities for potential power savings.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
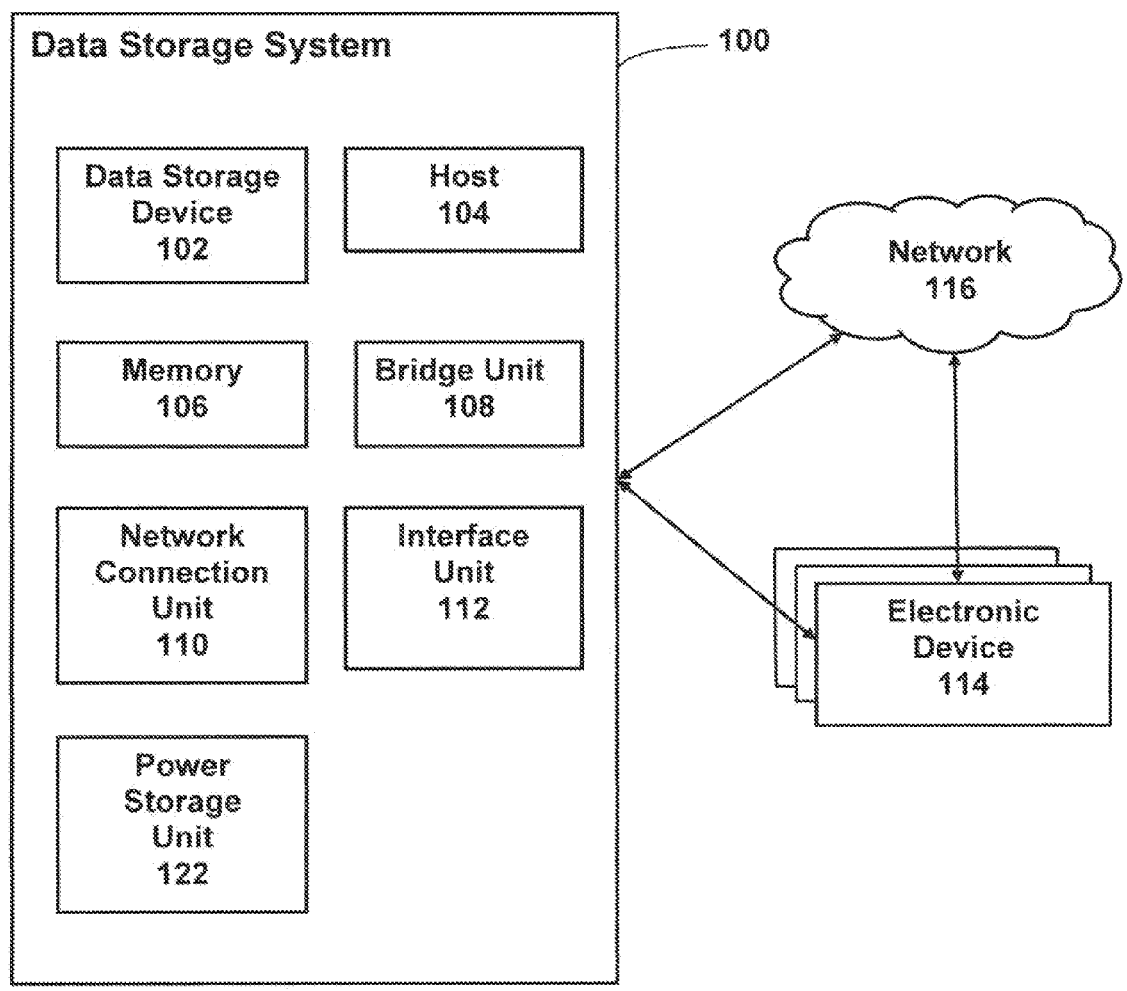
FIG. 1 depicts a data storage system configured to be connected to a network and an electronic device according to an embodiment.

In an embodiment, a data storage system 100 is configured to be connected to an electronic device 114 either directly, or through a network 116 as shown in FIG. 1. In an embodiment, the network 116 comprises a wide area network ("WAN"), a local area network ("LAN"), the Internet, or any combination thereof. In an embodiment, the network 116 can also comprise a router. In an embodiment, the electronic device 114 comprises a computer, a laptop, a mobile device, a phone, a tablet, a set top box, or any other device which may wish to access data from the data storage system 100.

In an embodiment, the data storage system 100 can comprise a network attached storage ("NAS"), a direct attached storage ("DAS"), or any combination thereof. In the embodiment shown in FIG. 1, the data storage system 100 comprises a data storage device 102, a host 104, a memory 106, a bridge unit 108, a network connection unit 110, an interface unit 112, and a power storage unit 122.

In an embodiment, the data storage system 100 can store content which the electronic device 114 may wish to access such as audio content, photo content, video content, other multimedia content, or other data which may be useful for the electronic device. For example, the data storage system 100 can supply audio or video streams to the electronic device 114 which can be played back or viewed on the electronic device 114. In an embodiment, the data storage system 100 can supply one or more streams of content to one or more electronic devices 114 connected to the data storage system 100. For example, the host 104 can supply one or more streams of content to one or more electronic devices 114 connected to the data storage system 100.

In an embodiment, the host 104 can control operations of the data storage system 100. The host 104 can comprise, for example, a processor. The electronic device 114 may directly connect with the data storage system 100 through the interface unit 112. In an embodiment, the interface unit 112 may comprise a universal serial bus ("USB") interface, a Thunderbolt interface, an Ethernet interface, or other types of interfaces which may facilitate data transfer between the data storage system 100 and the host 104. In an embodiment, the network connection unit 110 is configured to connect to the network 116. The network connection unit 110 can provide a wired or wireless connection to the network 116. Thus, the data storage system 100 may be connected to the electronic device 114 through the network 116. In addition, in an embodiment, the network connection unit 110 can provide a wired or wireless connection to the electronic device 114 without using the network 116.

In an embodiment, the network connection unit 110 can provide wireless connections using WiFi or other protocols, such as 802.11 standards. In an embodiment, the 802.11 standards can comprise 802.11 a/b/g/n/ac standards. In an embodiment, the network connection unit 110 can provide wireless connections using a Bluetooth standard or near field communications technology.

In an embodiment, the bridge unit 108 can provide translation of instructions or information from one protocol to another and can also facilitate communications between the electronic device 114 and the host 104, the electronic device 114 and the data storage device 102, the host 104 and the data storage device 102, or any combination thereof.

In an embodiment, the memory 106 is configured to store data, such as the content, which may be transmitted to the electronic device 114. In an embodiment, the memory 106 comprises a cache for storing the content. The memory 106 may store data which originated from the data storage device 102. In an embodiment, the memory 106 comprises a volatile memory. In an embodiment, the memory 106 comprises a random access memory ("RAM") such as a dynamic random access memory ("DRAM").

In an embodiment, the power storage unit 122 comprises a battery, a backup uninterruptable power supply, or other types of devices which can store and supply power to the data storage system 100. The power storage unit 122 can store power which can be used to power the data storage system 100 when the data storage system 100 is not connected to an external power source. That is, the data storage system 100 can operate using only power supplied by the power storage unit 122. The power storage unit 122 can store, for example, a limited amount of power.

For example, the data storage system 100 may comprise a plug which can be connected to an external power source such as an electronic device, a wall outlet, or other power source. However, when the plug is not connected to an external power source, the power storage unit 122 may supply power to the data storage system 100. This may occur, for example, if a user places the data storage system 100 in an area where an external power source may not be readily available, such as during automobile trips (where an adapter such as an AC/DC adapter is not available), at a beach, or other locations.

Figure 2:
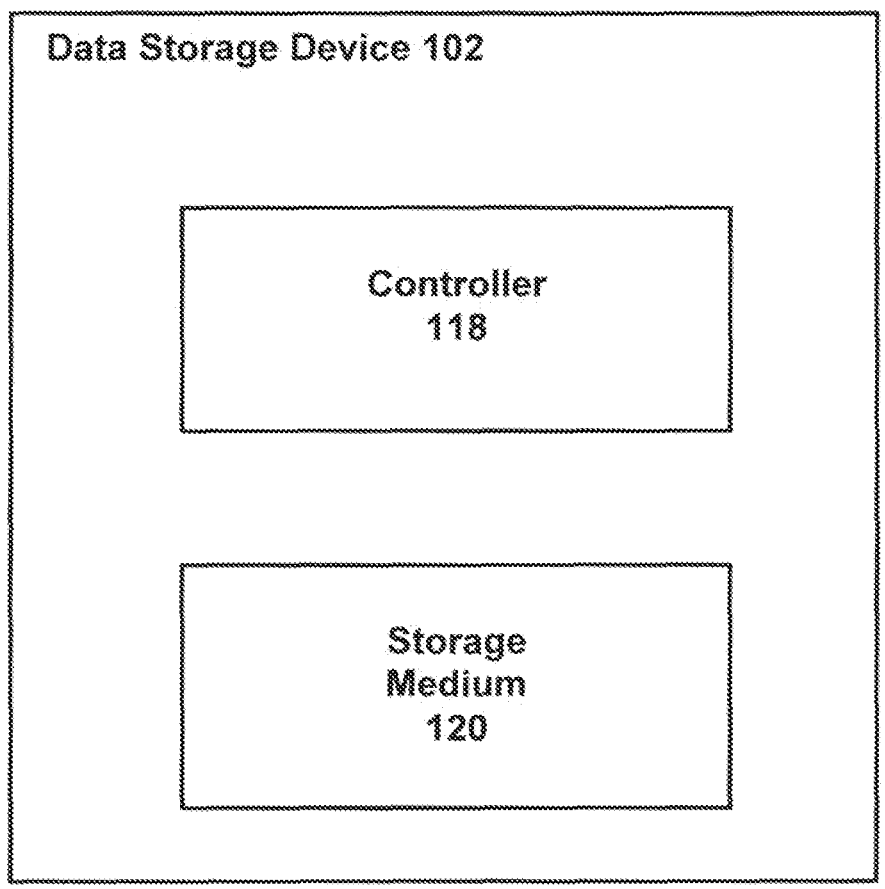
FIG. 2 depicts a data storage device according to an embodiment.

In an embodiment, the data storage device 102 is shown in FIG. 2. The data storage device 102 comprises, for example, a controller 118 and a storage medium 120. The controller 118 can, for example, control operations of the data storage device 102. In an embodiment, the storage medium 120 can comprise a magnetic rotating disk, a solid state memory, or any combination thereof. Thus, the data storage device 102 can, for example, comprise a hard disk drive, a solid state drive, or a hybrid drive. In an embodiment, the storage medium 120 can also comprise magnetic tape, and the data storage device 102 can comprise a tape drive.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Figure 3:
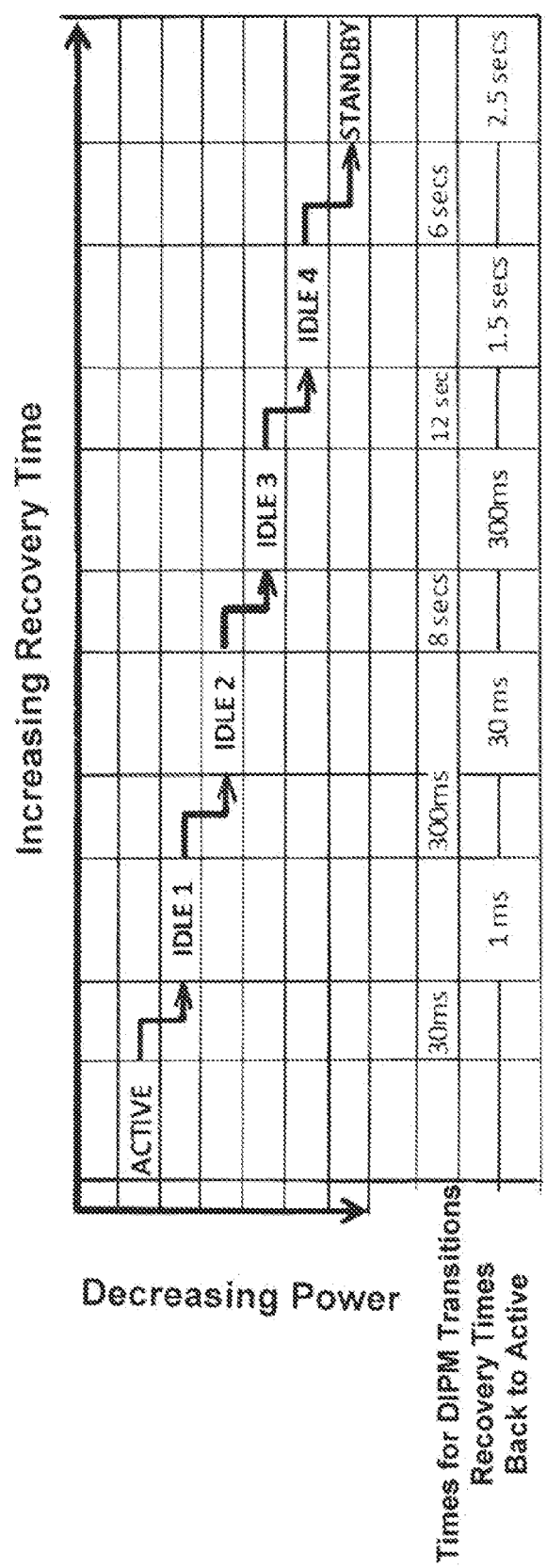
FIG. 3 depicts recovery times and power usage for various power modes according to an embodiment.

In an embodiment, the data storage device 102 can provide device initiated power management ("DIPM") as shown in an embodiment in FIG. 3. In the embodiment shown in FIG. 3, the data storage device 102 can be configured to be in one or more power modes such as an active mode, IDLE 1 mode, IDLE 2 mode, IDLE 3 mode, IDLE 4 mode, or standby mode. In an embodiment, at least three power modes are utilized. In an embodiment, more or less power modes may be utilized. Furthermore, different power modes may also be utilized.

In an active mode, the data storage device 102 can be fully ready for data reads and writes. For example, if the storage medium comprises a magnetic rotating disk, the magnetic rotating disk can be spinning at its target speed. In the IDLE 1 mode, a channel for reading data can be off for the data storage device 102. In the IDLE 2 mode, a head for writing data to the storage medium, such as when the storage medium comprises the magnetic rotating disk, can be floating.

In the IDLE 3 mode, the head can be parked. For example, the head can be placed in a location such that it does not hover over the magnetic rotating disk. In an embodiment, the head can be locked in place at a location where the head does not hover over the magnetic rotation disk.

In the IDLE 4 mode, the storage medium, such as when the storage medium comprises the magnetic rotating disk, can have a reduced rotational speed. For example, the rotational speed may be reduced from a first amount of RPM to a second amount of RPM less than the first amount of RPM. In an embodiment, the first amount of RPM comprises 5400 RPM and the second amount of RPM comprises 2000 RPM. Of course, such values are merely exemplary and the first amount of RPM and the second amount of RPM can comprise other values.

In the standby mode, the data storage device 102 can enter hibernation or into a reduced power state relative to the other modes. In an embodiment, during the standby mode, the data storage device 102 can be substantially powered down.

As can be seen in the embodiment shown in FIG. 3, each of the power modes consume a different amount of power with the active mode consuming the most amount of power and the standby mode consuming the least amount of power. For example, the active mode can consume more power than the IDLE 1 mode, the IDLE 1 mode can consume more power than the IDLE 2 mode, the IDLE 2 mode can consume more power than the IDLE 3 mode, the IDLE 3 mode can consume more power than the IDLE 4 mode, and the IDLE 4 mode can consume more power than the standby mode. Furthermore, in an embodiment, the controller 118 can control which power mode to place the data storage device 102 in, which will be described in more detail below.

In the embodiment shown in FIG. 3, the time required for transitioning between power modes are shown along with the time required to transition from the power mode back to back to the active mode. For example, it will require 300 ms to transition from the IDLE 1 mode to the IDLE 2 mode, and 30 ms to transition from the IDLE 2 mode back to the active mode. The times listed in the embodiment shown in FIG. 3 are merely exemplary and other times may be used instead.

Figure 4:
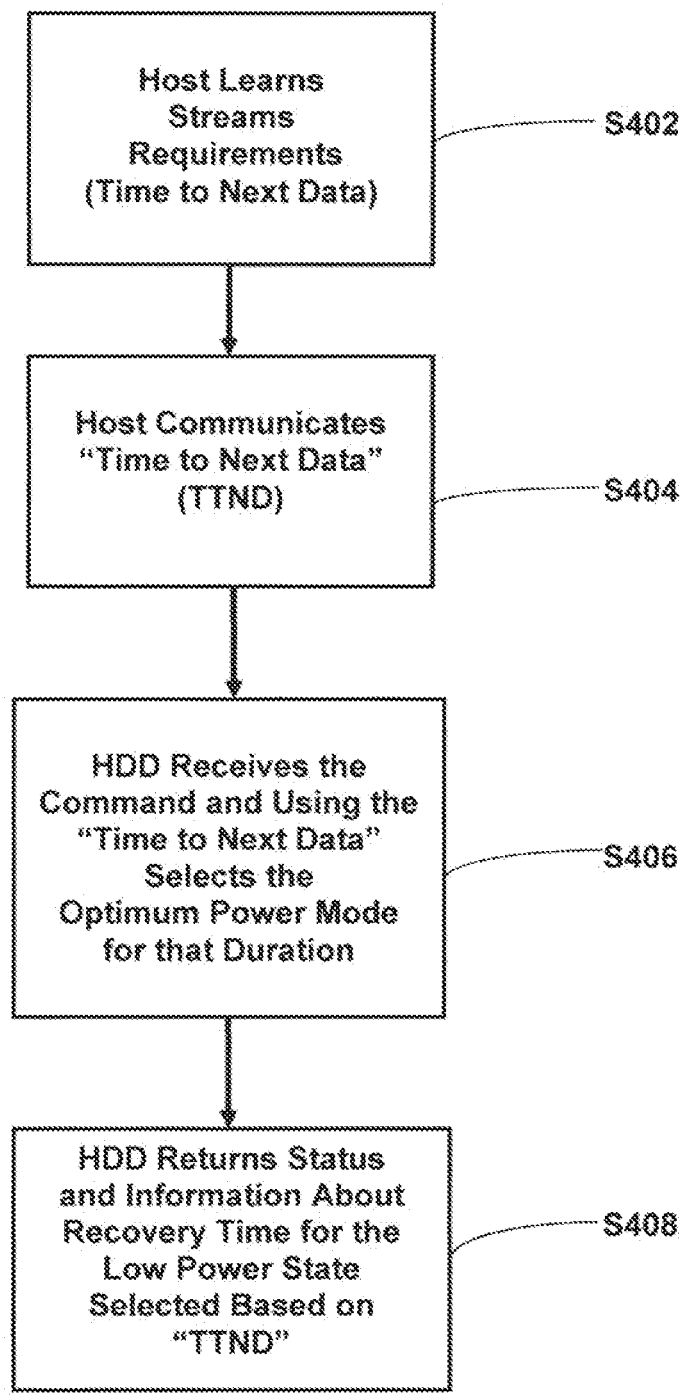
FIG. 4 depicts a process for operating a data storage system according to an embodiment.

In an embodiment, power management for the data storage device 102 can be performed based on a process shown in FIG. 4. In block S402, the host 104 learns stream requirements such as the time to next data information. In block S404, the host 104 communicates the time to next data information to the data storage device 102. For example, the host 104 can use a time command such as a vendor unique time command. That is, the time to next data information can indicate when the host 104 will need to access data stored in the data storage device 102, such as the content stored in the storage medium 120. In an embodiment, the host 104 can determine the time to next data information based on the amount of data remaining in the memory 106, which has not been consumed yet by the electronic device 114. In an embodiment, the host 104 can determine the time to next data information based on a number of streams provided to the one or more electronic devices 114. In an embodiment, the time to next data information can comprise an exact or absolute time, such as 6:00 p.m. Pacific Standard Time, or 1:00 a.m. Greenwich Mean Time. In an embodiment, the time to next data information can comprise a relative time, such as 30 seconds from now. Furthermore, in an embodiment, the time to next data information can also comprise other temporal measurements such as clock cycles, data transferred, or other measurements which can indicate time.

In block S406, the data storage device 102 receives the time command comprising the time to next data information and selects the optimized power mode for that duration. For example, the controller 118 can utilize the time to next data information and select the appropriate power mode based on the time to next data information. In block S408 the controller 118 can place the data storage device 102 in the selected power mode.

In an embodiment, the power mode selected can be the power mode which consumes the least amount of power, but which can transition back to the active power mode within a time period indicated in the time to next data information.

For example, if the time period indicated in the time to next data information is 1 second, then the controller 118 may select the IDLE 3 mode as the power mode because the IDLE 3 mode utilizes less power than the IDLE 2 mode and only requires 300 ms to transition back to the active mode. Furthermore, the controller 118 may not select the IDLE 4 mode because the IDLE 4 mode requires 1.5 seconds to transition back to active mode, which is greater than 1 second.

In an embodiment, this is beneficial because it can reduce the amount of time that the data storage device 102 is in a power mode which consumes greater power. That is, if the controller 118 determines that the IDLE 4 mode should be the selected power mode based on the time period indicated in the time to next data information, the controller 118 does not need to place the data storage device 102 first in the IDLE 1 mode, then the IDLE 2 mode, then the IDLE 3 mode, and finally the IDLE 4 mode. Instead, the controller 118 can directly place the data storage device 102 in the IDLE 4 mode. Since the data storage device 102 spends more time in the IDLE 4 mode, the data storage device 102 consumes less power. Furthermore, since it takes time to transition from one power mode to another power mode, in some instances, the data storage device 102 may not reach the power mode which consumes the least amount of power without direct placement of the data storage device 102 in that power mode by the controller 118.

This is especially beneficial when the data storage system 100 is utilizing power from the power storage unit 122, which stores a limited amount of power. This can prolong the amount of time that the data storage system 100 is operational.

In an embodiment, controller 118 can also select the power mode by taking into account the impact on longevity of the electromechanical components within the data storage device 102. Thus, if the power savings would only be for a short period of time, the data storage device 102 may transition from a first power mode to a second power mode to reduce power consumption even when a third power mode is available which reduces power consumption by a greater amount than the second power mode, and both the second power mode and the third power mode satisfy the constraints of the time period indicated in the time to next data information. This may occur, for example, when the third power mode causes more wear and tear on the electromechanical components than the second power mode and the time period indicated in the time to next data information is relatively short which results in little power savings. For example, the data storage device 102 may only be able to park the head so many times before there is an increased risk of component failure.

In an embodiment, the controller 118 may skip a power mode which causes more wear and tear on the electromechanical components. For example, the controller 118 may select the fourth power mode, even if the power savings isn't that much greater than the third power mode, and even if it requires a much longer time period to transition to the active mode from the fourth power mode.

In block S408, the data storage device 102 returns to the host 104 power mode data such as power mode status, recovery time information, or any combination thereof. For example, the controller 118 can indicate to the host 104 which power mode that the controller 118 has placed the data storage device in, and also the corresponding recovery time information. The recovery time information can indicate an amount of time required to transition the data storage device 102 from the selected power mode to the active mode.

In an embodiment, the host 104 can utilize such information to determine when it has to send a command to the data storage device 102 to wake up the data storage device 102. For example, if the host 104 determines that the content stored in the memory 106 will be consumed in 10 seconds, the host 104 may send a command to the data storage device 102 to wake up the data storage device 102 when there are 5 second left of content stored in the memory 106 when the data storage device 102 is in the standby state.

However, if the data storage device 102 is in the IDLE 2 mode, the host 104 may wait until there is 2 second left of content stored in the memory 106 before issuing such a command. As previously noted, the recovery time from the IDLE 2 mode is 30 ms, thus the host 104 may be able to wait longer than if the data storage device 102 was in the standby mode or the IDLE 4 mode to wake up the data storage device 102. This allows the data storage device 102 to be in a mode which consumes less power relative to the active mode for a longer period of time.

Again, in an embodiment, this may be beneficial when the data storage system 100 is being powered only by the power storage unit 122.

In an embodiment, the data storage device 102 can be interchanged with other data storage devices with different characteristics and still have a reduced amount of power consumption. For example, since the host 104 need not select the power mode to place the data storage device 102, the host 104 need not know the characteristics of the specific data storage device 102 in order for the data storage device 102 to be placed into the desired power mode. This can be beneficial, for example, where new or different models of data storage devices 102 are introduced, there are a large amount of data storage devices 102 available, or there are many different types of data storage devices 102 available.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A data storage system comprising:
   memory configured to store content;
   a host configured to determine time to next data information based on the content stored in the memory; and
   a data storage device comprising a controller configured to:
      receive the time to next data information from the host;
      select a power mode for the data storage device from a plurality of power modes for the data storage device based on the time to next data information and based on an impact of the selected power mode on a longevity of electromechanical components of the data storage device; and
      place the data storage device in the selected power mode,
   wherein the host is further configured to transmit the time to next data information to the data storage device.

2. The data storage system of claim 1 wherein:
   the plurality of power modes comprises at least a first power mode, a second power mode, and a third power mode;
   the third power mode comprises a reduced power mode relative to the second power mode; and
   the second power mode comprises a reduced power mode relative to the first power mode.

3. The data storage system of claim 2 wherein the plurality of power modes comprises at least an active power mode and a standby power mode.

4. The data storage system of claim 1 further comprising a network connection unit configured to wirelessly connect to one or more electronic devices.

5. The data storage system of claim 4 wherein the host is further configured to provide one or more streams of the content to the one or more electronic devices.

6. The data storage system of claim 5 wherein the host is further configured to determine the time to next data information further based on a number of streams provided to the one or more electronic devices.

7. The data storage system of claim 1 wherein the controller is further configured to provide power mode data for the selected power mode to the host.

8. The data storage system of claim 7 wherein the power mode data comprises recovery time information for the selected power mode.

9. The data storage system of claim 7 wherein the host is further configured to wake up the data storage device to refresh the content stored in the memory based on the power mode data.

10. The data storage system of claim 1 wherein the data storage device comprises a hard disk drive.

11. A method for operating a data storage system comprising:
    determining time to next data information based on content stored in a memory in the data storage system using a host in the data storage system;
    transmitting the time to next data information to a data storage device in the data storage system;
    receiving the time to next data information at a controller in the data storage device;
    selecting, using the controller, a power mode for the data storage device from a plurality of power modes for the data storage device based on the time to next data information and based on an impact of the selected power mode on a longevity of electromechanical components of the data storage device; and
    placing the data storage device in the selected power mode using the controller.

12. The method of claim 11 wherein:
    the plurality of power modes comprises at least a first power mode, a second power mode, and a third power mode;
    the third power mode comprises a reduced power mode relative to the second power mode; and
    the second power mode comprises a reduced power mode relative to the first power mode.

13. The method of claim 12 wherein the plurality of power modes comprises at least an active power mode and a standby power mode.

14. The method of claim 11 wherein the host is further configured to provide one or more streams of the content to one or more electronic devices wirelessly connected to the data storage system.

15. The method of claim 14 wherein the host is further configured to determine the time to next data information further based on a number of streams provided to the one or more electronic devices.

16. The method of claim 11 further comprising providing power mode data for the selected power mode to the host using the controller.

17. The method of claim 16 wherein the power mode data comprises recovery time information for the selected power mode.

18. The method of claim 16 further comprising waking up the data storage device to refresh the content stored in the memory based on the power mode data using the host.

19. The method of claim 11 wherein the data storage device comprises a hard disk drive.

20. A data storage device comprising:
    a controller configured to:
       receive time to next data information from a host connected to the data storage device;
       select a power mode for the data storage device from a plurality of power modes for the data storage device based on the time to next data information and based on an impact of the selected power mode on a longevity of electromechanical components of the data storage device; and
       place the data storage device in the selected power mode.

21. The data storage device of claim 20 wherein:
    the plurality of power modes comprises at least a first power mode, a second power mode, and a third power mode;
    the third power mode comprises a reduced power mode relative to the second power mode; and
    the second power mode comprises a reduced power mode relative to the first power mode.

22. The data storage device of claim 21 wherein the plurality of power modes comprises at least an active power mode and a standby power mode.

23. The data storage device of claim 20 wherein the controller is further configured to provide power mode data for the selected power mode to the host.

24. The data storage device of claim 23 wherein the power mode data comprises recovery time information for the selected power mode.

25. The data storage device of claim 20 wherein the data storage device comprises a hard disk drive.

* * * * *